J. BERGESEN.
OSCILLATING ENGINE AND SELF REGULATING GEAR THEREFOR.
APPLICATION FILED SEPT. 11, 1913.
1,116,974.
Patented Nov. 10, 1914.
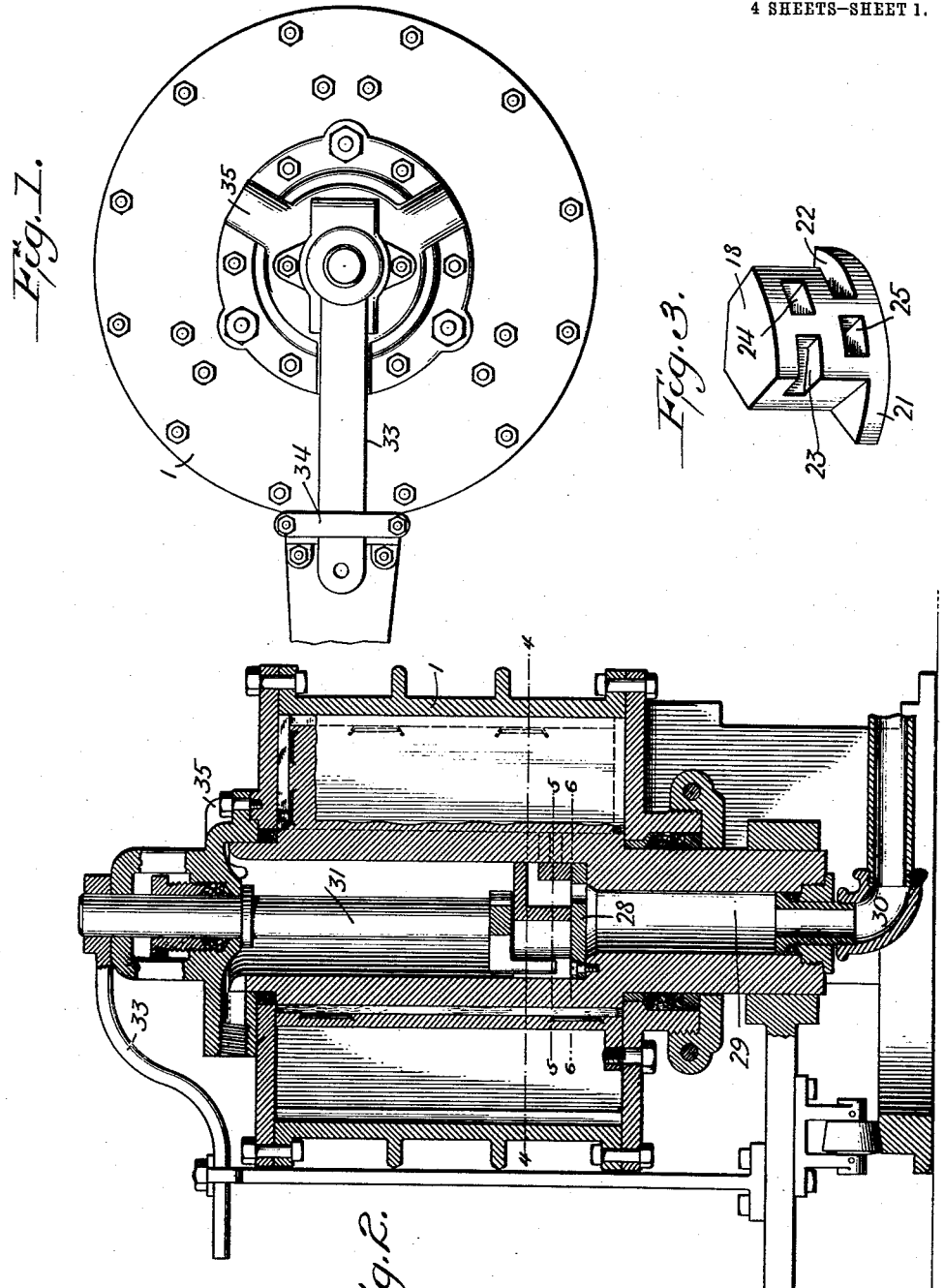
INVENTOR
JOHN BERGESEN J. BERGESEN.
OSCILLATING ENGINE AND SELF REGULATING GEAR THEREFOR.
APPLICATION FILED SEPT. 11, 1913.
1,116,974.
Patented Nov. 10, 1914.
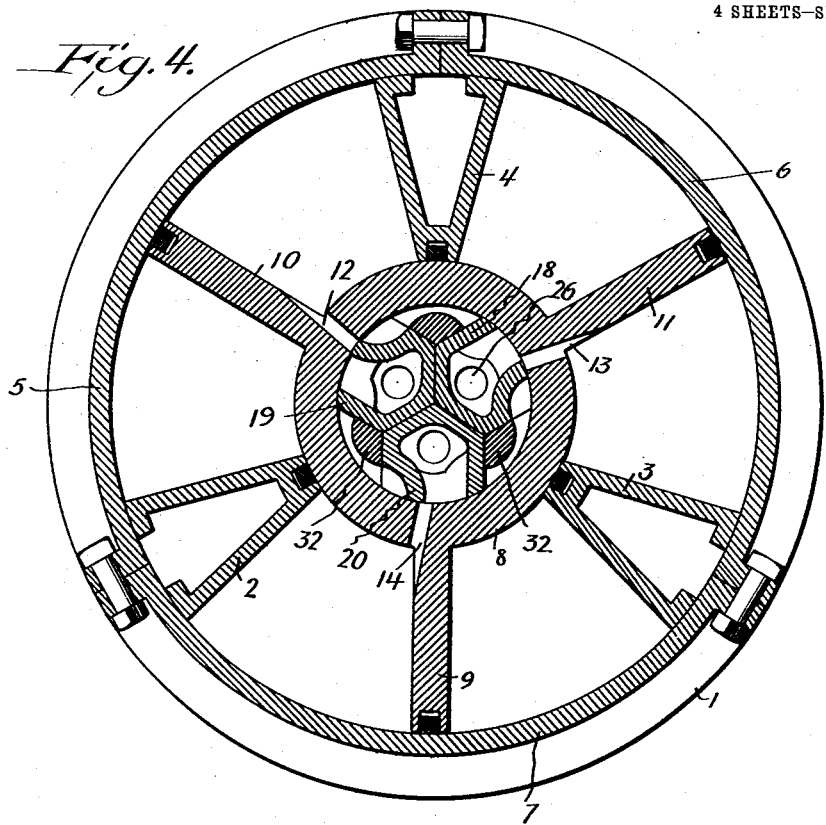
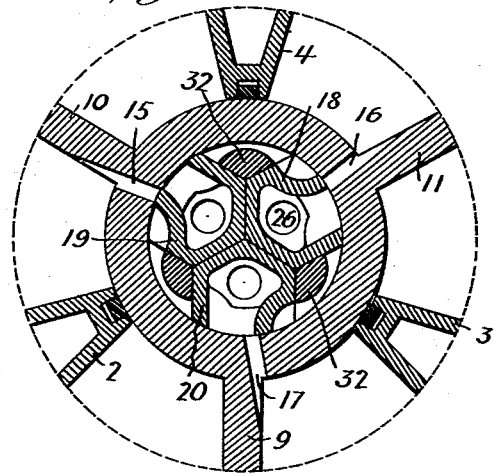
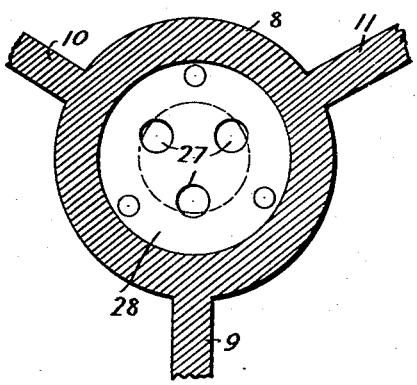
WITNESSES
INVENTOR
JOHN BERGESEN
BY
ATTORNEYS J. BERGESEN.
OSCILLATING ENGINE AND SELF REGULATING GEAR THEREFOR.
APPLICATION FILED SEPT. 11, 1913.
1,116,974.
Patented Nov. 10, 1914.
4 SHEETS—SHEET 3.
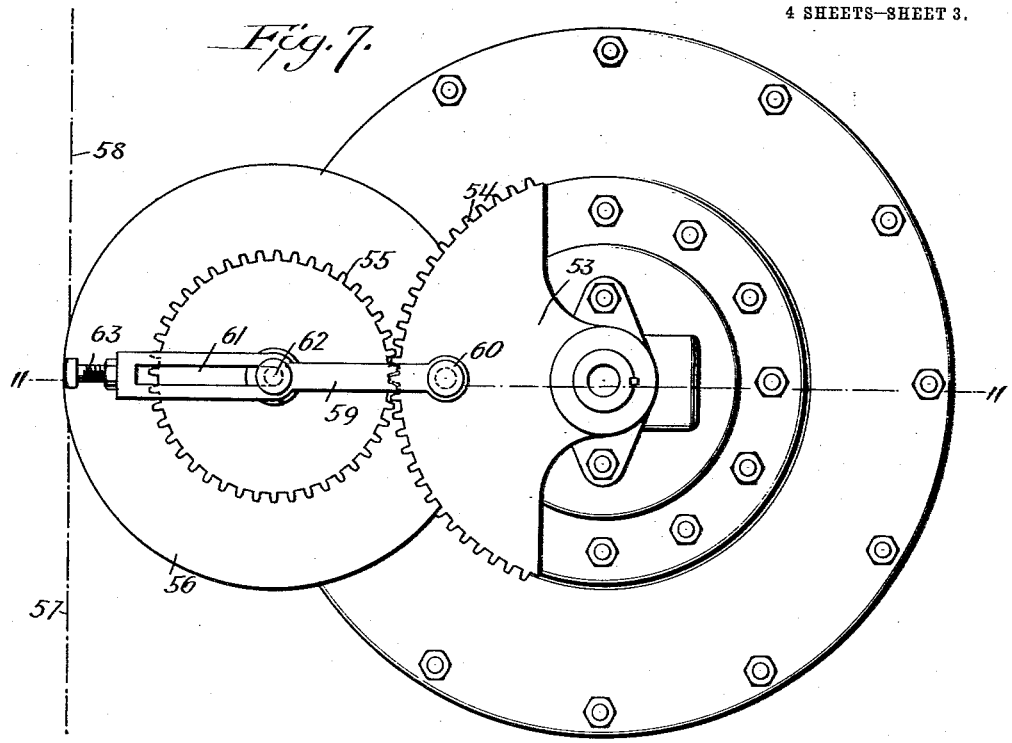
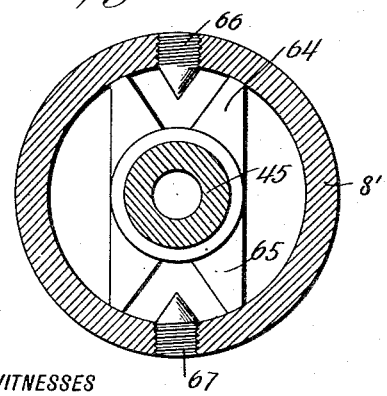
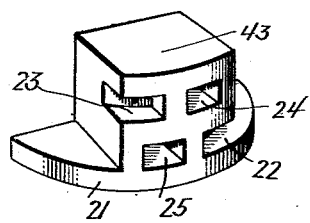
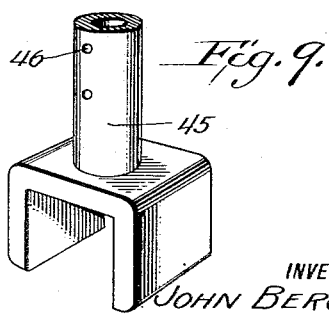
WITNESSES
INVENTOR
JOHN BERGESEN
BY
ATTORNEYS J. BERGESEN.
OSCILLATING ENGINE AND SELF REGULATING GEAR THEREFOR.
APPLICATION FILED SEPT. 11, 1913.
1,116,974.
Patented Nov. 10, 1914.
4 SHEETS—SHEET 4.
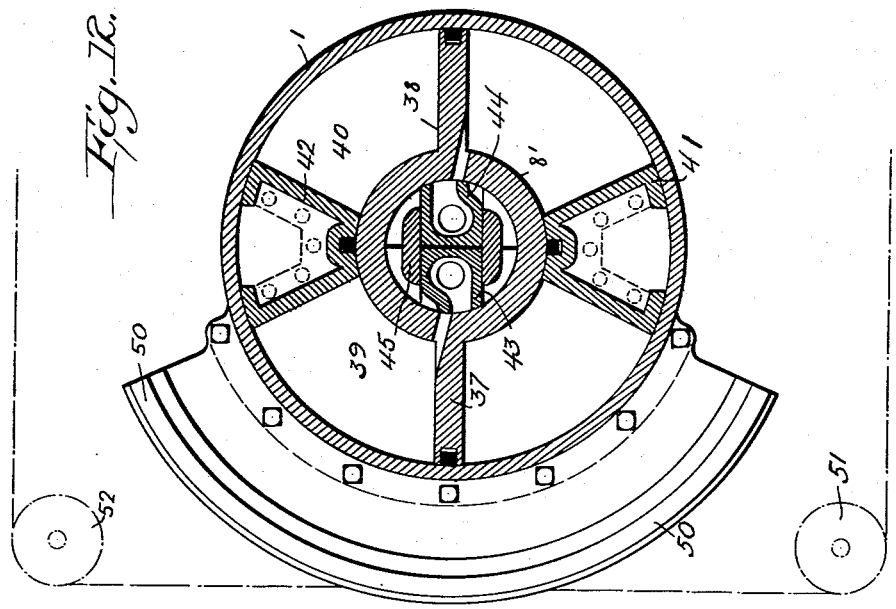
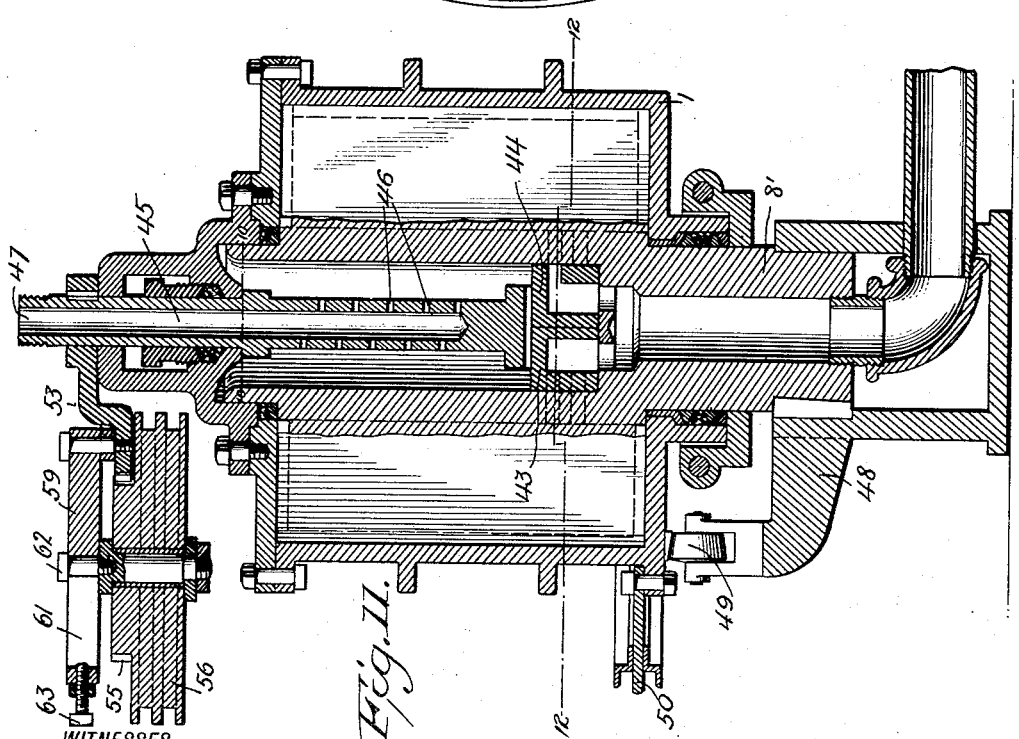
WITNESSES
INVENTOR
JOHN BERGESEN
BY
ATTORNEYS

UNITED STATES PATENT OFFICE

JOHN BERGESEN, OF NEW YORK, N. Y.

OSCILLATING ENGINE AND SELF-REGULATING GEAR THEREFOR.

1,116,974.  Specification of Letters Patent.  Patented Nov. 10, 1914.

Application filed September 11, 1913. Serial No. 789,249.

*To all whom it may concern:*

Be it known that I, JOHN BERGESEN, a citizen of the United States, and a resident of the city of New York, Borough of Brooklyn, in the county of Kings and State of New York, have invented a new and Improved Oscillating Engine and Self-Regulating Gear Therefor, of which the following is a full, clear, and exact description.
This invention relates to improvements in engines, and particularly to engines of the oscillating type, and also to the valve gear designed to properly control the same.

The object in view is to provide an engine of the oscillating type with a plurality of pistons and suitable valve gearing so that a maximum power may be provided in a minimum space and at a minimum cost.

Another object in view is to provide an engine with a plurality of pistons controlled from improved centrally arranged valves which may be variously adjusted for admitting and exhausting pressure from in front of any of the pistons or all simultaneously in order to provide any power desired.

A still further object of the invention is to provide an engine of the oscillating type with an improved valve gearing which will be automatically actuated by shutting off the steam at any point.

In carrying out the object of the invention a housing or cylinder is provided in which a plurality of abutments are arranged so as to divide the cylinder into compartments.
In the cylinder are arranged a plurality of pistons, one piston for each compartment, and all of the pistons rigidly connected with a centrally arranged hollow piston rod or operating shaft. In this operating shaft are a plurality of valves which control the inlet and exhaust, there being one valve for each compartment. In order that the valves may be properly operated an operating rod is provided which engages all of the valves so as to operate the same simultaneously. In order that this valve controlling device may be actuated from a distance and may be caused to control the valve properly a valve gear is connected therewith which comprises an arm having a segment which meshes with a gear wheel carried by a cable operated drum. When this drum is rotated power will be of course communicated through the gear wheel and the segmental rack and the valve turned to a greater or less extent.

In the accompanying drawings—Figure 1 is a top plan view of an embodiment of the invention; Fig. 2 is a longitudinal vertical section through Fig. 1; Fig. 3 is an enlarged detail perspective view of one of the valves;
Fig. 4 is an enlarged section through Fig. 2 on line 4—4; Fig. 5 is an enlarged section through Fig. 2 on line 5—5; Fig. 6 is an enlarged sectional view through Fig. 2 on line 6—6; Fig. 7 is a top plan view of a slightly modified form of the invention in which the valve gear is shown connected with the valve; Fig. 8 is an enlarged detail perspective view of one of the valves used in connection with the engine disclosed in Figs. 1 and 11; Fig. 9 is an enlarged detail perspective view of one end of the valve controlling shaft; Fig. 10 is a section through Fig. 11 on line 10—10; the same being on a slightly enlarged scale; Fig. 11 is a section through Fig. 7 on line 11—11; Fig. 12 is a section through Fig. 11 approximately on line 12—12.

Referring to the accompanying drawings by numeral, 1 indicates a cylinder or housing which has rigidly connected therewith abutments 2, 3 and 4 so as to divide the cylinder 1 into compartments. In the construction of the cylinder 1 the same may be made of any desired size, and when made comparatively large it is cast in sections 5, 6 and 7 which are machined off in any desired manner, and then bolted together as clearly shown in Fig. 4, whereby a large cylinder is provided without making a comparatively large single casting.
Arranged in the cylinder 1 is a hollow shaft 8 provided with pistons 9, 10 and 11 operating in the various compartments between the abutments 2, 3 and 4. In Fig. 4 three pistons have been shown though a greater or less number could be provided, this number, however, being desirable for securing a desirable length of stroke and a maximum power. In Fig. 12 a structure is shown in which two pistons are used which will give a longer stroke with a large amount of power. Arranged in the shaft 8 are two sets of ports, namely ports 12, 13 and 14, and ports 15, 16 and 17, these sets of ports being arranged in different planes so as to properly operate with the valves 18, 19 and 20, the detailed structure of these valves being disclosed in Fig. 3. Referring to this figure it will be observed that the valves have a base 21 and inlet ports 22 and 23 and outlet exhaust ports 24 and 25, the outlet ports 24 and 25 merging into a vertical passageway 26 (Fig. 4) so that the exhaust may pass out one of the openings 27 formed in plate 28. From openings 27 the exhaust passes through bore 29 into the exhaust pipe 30.

In connection with the valves 18, 19 and 20 it will be observed that the controlling shaft 31 has three prongs or projections 32 which engage and hold the various valves in place, and also which throw the valves for opening and closing the same. The shaft 31 has a controlling arm 33 secured to the outer end, which arm is guided by a strap 34 in its movement, strap 34 being made of any desired length so as to give arm 33 the desired movement. Ordinarily, however, arm 33 need not be moved considerably as a small movement will open the various valves and then the shaft 8 will be rotated until the valves are closed, the cylinder 1 being rigidly held against movement.

In operation a suitable pressure pipe is connected with one of the ports 35, or pressure pipes may be connected to all of the ports, if desired. If only one pressure pipe is connected to the port 35 the other ports are closed by a suitable cap, not shown. After the pressure pipe has been properly connected up and the pressure turned on pressure will be maintained in the hollow shaft 8 around the operating shaft 31 so as to enter the various compartments in the cylinder as soon as the valves are opened. The valves may be set to open simultaneously, or may be set so that one valve will open slightly, followed a little later by a second valve, and finally by a third valve so that the pressure may be gradually applied and the power gradually increased. It will of course be evident that various other adjustments could be had without in any way departing from the spirit of the invention. With the shaft 8 supplied with pressure the device is ready for operation. In case the lever 33 was moved in either direction the valves would be operated and pressure would be allowed to pass through some of the ports into certain of the compartments, and thus move the shaft 8 one way or the other. The movement of the shaft 8 is in the same direction as the movement of lever 33 so that the shaft will move the various ports to a closed position provided the movement of lever 33 has not been continued. By a continued movement of lever 33 the shaft can be caused to move to its extreme position. As the shaft 8 continues to move the same carries with it arm 36 to which the rudder or other device is connected.

In Figs. 7 to 12, inclusive, is disclosed a slightly modified form of the invention in which similar reference numerals will be used for similar parts, and additional numerals for additional parts. Referring to these figures by numeral, the shaft 8' is provided with pistons 37 and 38 which operate in compartments 39 and 40 formed in the cylinder 1. Abutments 41 and 42 are provided for dividing cylinder 1 into compartments 39 and 40. Arranged in the shaft 8' so as to properly operate the engine are valves 43 and 44 constructed similar to valve 18 shown in Fig. 2, but arranged so that the two valves may abut as shown in Fig. 12, and with a bifurcated controlling member 45 may straddle the two valves. The controlling member 45 is formed hollow, and also formed with a plurality of radiating apertures or passageways 46 so that steam entering the outer end 47 of member 45 will pass through aperture 46 into the shaft 8' and thence through the ports in the cylinder 1 in a similar manner to the preferred structure. In this form of the invention instead of the piston and the shaft 8' rotating the same are keyed or otherwise rigidly secured to a support 48. The cylinder 1 is then caused to rotate about shaft 8', a suitable anti-friction member 49 being provided for reducing the friction. This form of invention is desirable where a comparatively strong and comparatively long movement is desired, as in lifts of various kinds. The engine also may be used for working doors, slides, feeding logs to saws, working signal devices and doing any other desired work which requires only a limited movement, and which ordinarily requires a back and forth movement. The power is taken off the cylinder 1 through a segment 50. Preferably, cables are secured to the segment 50 and pass over pulleys 51 and 52 to the particular device to be operated and move back and forth as desired.

Rigidly secured to the operating shaft 45 is an arm 53 formed with a segmental rack 54 (Fig. 7) which is adapted to mesh with gear wheel 55, which gear wheel is rigidly secured to or formed integral with a double drum 56. Drum 56 has connected therewith cables 57 and 58 which rotate the drum and also swing the same from one position to the other, as shown in Fig. 7, so as to turn the shaft 45. A link 59 is pivotally mounted at 60 to arm 53, and is formed with a slot 61 in which pin 62 is fitted so that when the drum 56 is thrown over to its extreme position, the pin 62 will strike the adjustable stop 63 and prevent any further movement so that gear wheel 55 cannot be moved out of mesh with rack 54. As cable 57 is pulled cable 58 will be fed on to the drum so that there will be a rotary movement to the drum and a slight swinging movement. By the arrangement of the link 59 and associate parts the drum 56 cannot be rotated beyond a certain degree, and by the arrangement shown in Fig. 10 means are provided for limiting the turning of the shaft 45. The shaft 45 is provided intermediate its length with bifurcated portions 64 and 65 into which project pins 66 and 67. In this way there is a double safety arrangement for limiting the movement of the valves. By the provision of members 59, 61, 62 and 63 the travel of the cylinders and valve is controlled as these members close the valve at the end of the stroke and thus prevent the tension head in the cylinder from striking the pistons.

Having thus described my invention I claim as new and desire to secure by Letters Patent—

1. In an oscillating piston engine, a cylinder formed into a plurality of sections, means for clamping said sections together so as to make a complete cylinder, an abutment rigidly secured to said cylinder at the juncture of each of said sections, whereby said cylinder is divided into a plurality of compartments, a piston arranged in each of said compartments, a shaft arranged centrally of the cylinder rigidly connected to said pistons, said shaft having a port on each side of each of the pistons, and a valve for each pair of ports for controlling the inlet and exhaust from the opposite sides of each of the pistons.

2. In an oscillating piston engine, a cylinder, a plurality of abutments arranged in said cylinder, whereby said cylinder is divided into compartments, a piston arranged in each of said compartments, a shaft connected with each of said pistons, said shaft being hollow and formed with a pair of ports at each piston, said ports opening on opposite sides of the piston, a valve arranged opposite each pair of said ports for controlling the inlet and exhaust, and a single controlling member engaging all of said valves for simultaneously shifting the same.

3. In an oscillating piston engine, a cylinder, a plurality of abutments arranged therein dividing the cylinder into compartments, a piston arranged in each of said compartments, a shaft rigidly secured to said piston, said shaft being formed with an enlarged bore merging into a reduced bore, said shaft having a pair of ports adjacent each of said pistons, said ports being arranged adjacent the juncture between the enlarged bore and the reduced bore of said shaft, a valve for each of said pistons resting on the shoulder between the enlarged bore and the reduced bore, and designed to control said ports, and an operating member engaging said valve for controlling the position thereof.

4. In an oscillating piston engine, a cylinder, a plurality of abutments arranged in said cylinder, a piston arranged between each pair of abutments, a shaft secured to all of said pistons, said shaft being formed with an enlarged bore, and a reduced bore opening into the enlarged bore, said shaft having a pair of ports for each piston arranged adjacent the juncture of said enlarged bore with said reduced bore, a bearing plate secured to said shaft in said enlarged bore, and on the shoulder provided at the juncture between the enlarged bore and the reduced bore, said plate having a plurality of openings, a valve arranged in said enlarged bore and resting on said plate for each of said pistons, each of said valves having an exhaust port designed to register with the openings in said plate, and with some of said ports while the other of said ports are in communication with said enlarged bore, means for directing pressure to said enlarged bore and a single controlling member for shifting the position of all of said valves so as to turn on and off the pressure to said cylinder and cause the same to be applied to either side of said pistons for moving the same in either direction.

5. In an oscillating piston engine, a cylinder, a plurality of abutments arranged in said cylinder dividing the cylinder into compartments, a piston arranged in each of said compartments, a shaft connected to said pistons, said shaft being hollow and formed with a pair of ports for each of said pistons so that the interior of the shaft may be brought into communication with either side of said piston, means for supplying steam to the interior of said shaft, a valve for each of said pistons for regulating the inlet and exhaust through said ports, an operating shaft for controlling the position of said valve, an arm for moving said operating shaft, and means operable from a distance for controlling the position of said arm.

In testimony whereof I have signed my name to this specification in the presence of two subscribing witnesses.

JOHN BERGESEN.

Witnesses:
  I. R. ROWLAND,
  JAMES BURNS.